United States Patent [19]

Blokzijl et al.

[11] Patent Number: 5,786,318
[45] Date of Patent: Jul. 28, 1998

[54] SOIL RELEASE POLYMERS AND DETERGENT COMPOSITIONS CONTAINING THEM

[75] Inventors: Wilfried Blokzijl, Amsterdam, Netherlands; Andrew Martin Creeth, Chester, United Kingdom; Alfred Roy Elmes, Wirral, United Kingdom; Andrew David Green, Liverpool, United Kingdom; Michael Hull, Gwynedd, United Kingdom; Katrin Dagmar Joule, Wirral, United Kingdom; Ezat Khoshdel, South Wirral, United Kingdom

[73] Assignee: Lever Brothers Company, Division of Conopco Inc., New York, N.Y.

[21] Appl. No.: 666,157

[22] Filed: Jun. 19, 1996

[30] Foreign Application Priority Data

| Jul. 6, 1995 | [GB] | United Kingdom | 9513799 |
| Jul. 6, 1995 | [GB] | United Kingdom | 9524515 |
| Sep. 4, 1995 | [GB] | United Kingdom | 9518011 |

[51] Int. Cl.$^6$ .................. C11D 3/00; C11D 17/00; C08G 63/00; C08G 63/66
[52] U.S. Cl. .................. 510/299; 510/421; 528/272; 528/300; 528/308; 528/308.6
[58] Field of Search .................. 510/299, 421; 528/272, 300, 308, 308.6

[56] References Cited

U.S. PATENT DOCUMENTS

| 3,379,548 | 4/1968 | Jen | 106/245 |
| 3,557,039 | 1/1971 | McIntyre et al. | 260/29.2 |
| 4,132,680 | 1/1979 | Nicol | 252/547 |
| 5,142,020 | 8/1992 | Kud et al. | 528/272 |
| 5,489,481 | 2/1996 | Hager et al. | 428/431 |
| 5,595,681 | 1/1997 | Panandiker et al. | 510/299 |

FOREIGN PATENT DOCUMENTS

| 0 001 305 | 4/1979 | European Pat. Off. . |
| 0 185 427 | 6/1986 | European Pat. Off. . |
| 0 241 984 | 10/1987 | European Pat. Off. . |
| 0 241 985 | 10/1987 | European Pat. Off. . |
| 0 272 033 | 6/1988 | European Pat. Off. . |
| 0 357 280 | 3/1990 | European Pat. Off. . |
| 0 442 101 | 8/1991 | European Pat. Off. . |
| 93133 | 12/1977 | Poland . |
| 121 510 | 1/1984 | Poland . |
| 1 240 713 | 7/1971 | United Kingdom . |
| 1 467 098 | 3/1977 | United Kingdom . |

OTHER PUBLICATIONS

Great Britain Search Report in Great Britain Patent Application No. 9513799.8.
Derwent Abstract of JP 62298437 A.

*Primary Examiner*—Mukund J. Shah
*Assistant Examiner*—Brenda Coleman
*Attorney, Agent, or Firm*—Rimma Mitelman

[57] ABSTRACT

A water-soluble copolyester comprising units of a polyglycol or capped polyglycol (for example, polyethylene glycol or polyethylene glycol methyl ether), an aromatic dicarboxylic acid (for example, terephthalic acid) and at least 30 mole % of a polyol having at least three hydroxyl groups (for example, glycerol), but free of ethylene glycol units, is a highly effective soil release polymer for use in detergent compositions. The aromatic dicarboxylic acid units may include units of a sulphonated aromatic dicarboxylic acid (for example, sulphoisophthalic acid).

16 Claims, No Drawings

SOIL RELEASE POLYMERS AND DETERGENT COMPOSITIONS CONTAINING THEM

TECHNICAL AREA

The present invention relates to novel copolymers exhibiting improved soil release properties, and to their use in detergent compositions for washing fabrics.

BACKGROUND AND PRIOR ART

Polyesters of terephthalic and other aromatic dicarboxylic acids having soil release properties are widely disclosed in the art, in particular, the so-called PET/POET (polyethylene terephthalate/polyoxyethylene terephthalate) and PET/PEG (polyethylene terephthalate/polyethylene glycol) polymers which are disclosed, for example, in U.S. Pat. No. 3,557,039 (ICI), GB 1 467 098 and EP 1305A (Procter & Gamble). Polymers of this type are available commercially, for example, as Permalose, Aquaperle and Milease (Trade Marks) (ICI) and Repel-O-Tex (Trade Mark) SRP3 (Rhône-Poulenc). Other patent publications disclosing soil release polymers which are condensation products of aromatic dicarboxylic acids and dihydric alcohols include EP 185 427A, EP 241 984A, EP 241 985A and EP 272 033A (Procter & Gamble).

The so-called PET/POET polymers have been found to enhance the oily and particulate soil detergency obtained from organic surfactant systems, especially on polyester and other synthetic fabrics: they are less effective on cotton, much larger quantities of polymer being required before an effect is observed. Certain deficiencies have also been found in terms of water solubility and, especially for particulate detergents use, processability.

EP 357 280A (Procter & Gamble) discloses sulphonated end-capped linear terephthalate oligomers which are condensation products of a low molecular weight diol, preferably propylene glycol or ethylene glycol, with terephthalic acid. These products are stated to have substantially linear backbones, and do not include branching or crosslinking tri- or polyvalent monomer groups such as tri-, tetra- or polycarboxylic acid monomer groups or tri-, tetra- or polyhydric alcohol monomer groups.

EP 442 101B (BASF) discloses soil release polymers intended for use in liquid detergent compositions having low water content. The polymers are obtainable by condensation of carboxylic acids containing at least two carboxyl groups, for example, terephthalic acid; glycerol, pentaerythritol, oligoglycerol or similar compounds; and long chain ($C_{8-24}$) alcohols, alkylphenols or alkylamines condensed with 5–80, preferably 25 or 50, moles of ethylene oxide. The presence of long hydrophobic chains confers on the polymers compatibility with liquid detergent compositions by allowing them to associate with surfactant mesophases. However, because of their greater hydrophobicity these polymers will generally exhibit lower solubility in water than the PET/POET and PET/PEG polymers mentioned previously.

PL 93 133B and PL 121 510B (Blachownia) disclose a fabric finishing agent that produces a soil- and crease-resistant finish on polyester and polyester/cellulose fabrics, which is a modified polyester prepared by transesterifying terephthalic acid dimethyl ester (1 mole) with ethylene glycol (2.0–3.0 moles), glycerol (0.3–0.5 mole) and polyethylene glycol of average molecular weight about 1540 (0.15–0.4 mole). The polyester is not water-soluble and is used in the form of a 15–20 wt % aqueous dispersion.

The present inventors have now identified a novel class of water-soluble copolymers based on dicarboxylic acids and polyols which provide effective soil release on both polyester and cotton fabrics, and which are also effective in reducing soil redeposition in the wash. The polymers are suitable for incorporation into detergent compositions of all physical types, for example, liquids, particulates (powders), and bars.

DEFINITION OF THE INVENTION

The present invention accordingly provides a water-soluble copolymer providing soil release properties when incorporated in a laundry detergent composition, the copolymer comprising:

(i) monomer units of poly(ethylene glycol) and/or capped poly(ethylene glycol) having the formula I

$$-O-(CH_2-CH_2O)_n- \qquad (I)$$

and/or the formula Ia:

$$X-O-(CH_2-CH_2-O)_n- \qquad (Ia)$$

wherein X is a hydrogen atom or a capping group, preferably a $C_{1-4}$ alkyl group, and n is an integer;

(ii) monomer units of one or more aromatic dicarboxylic acids having the formula II

$$-CO-Ar-CO-O- \qquad (II)$$

wherein Ar is a bifunctional aromatic group, optionally including units in which Ar is sulphonated; and (iii) at least 30 mole % of monomer units of a polyol having at least 3 hydroxyl groups, having the formula III:

$$-CH_2-A-CH_2-O- \qquad (III)$$

wherein A is a bifunctional group containing at least 1 carbon atom and at least 1 hydroxyl group.

The invention also provides a granular adjunct suitable for incorporation into a particulate detergent composition, which comprises a copolymer as defined above on a particulate carrier material.

The invention further provides a detergent composition for washing fabrics, comprising one or more organic surfactants, optionally one or more detergency builders, and a soil release effective amount of a copolymer as defined above, the composition preferably comprising (i) from 2 to 50 wt % of an organic surfactant component comprising one or more anionic, nonionic, cationic, amphoteric or zwitterionic surfactants, (ii) from 0 to 80 wt % of a builder component comprising one or more inorganic or organic detergency builders, (iii) a soil release component comprising an effective amount, preferably from 0.02 to 10 wt % and more preferably from 0.1 to 3 wt %, of a copolymer as defined above, and (iv) optionally other ingredients to 100 wt %, all percentages being based on the detergent composition.

DETAILED DESCRIPTION OF THE INVENTION

The Polymers

Unlike the prior art PET/POET and similar polymers, the copolymers of the invention do not contain ethylene glycol units. They contain a substantial proportion (at least 30 mole %) of units of a tri- or polyhydric alcohol, preferably glycerol, but surprisingly the crosslinking and insolubility that would be expected does not occur. Instead, the presence of additional hydroxyl groups appears to increase water-solubility, since the polymers of the invention exhibit higher water-solubility than commercially available PET/POET polymers.

The polymers are therefore more weight effective and can be used in smaller quantities in detergent compositions.

Furthermore, the rate of dissolution and delivery of benefits into the wash is greater than that of prior art polymers, which is especially beneficial for use in short-wash-time machine washing.

In addition, the polymers of the invention may readily be combined with suitable carrier materials, notably inorganic salts, to provide stable heat-insensitive fast-dissolving granules suitable for incorporation into particulate detergent compositions.

The water-soluble copolymers of the invention are obtainable from the condensation of a monomer mixture comprising:

(i) poly(ethylene glycol) and/or capped poly(ethylene glycol) having the formula I'

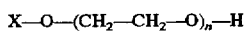

$$X-O-(CH_2-CH_2-O)_n-H \quad (I')$$

wherein X and n have the meanings given previously,
(ii) one or more aromatic dicarboxylic acids or derivatives thereof having the formula II'

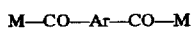

$$M-CO-Ar-CO-M \quad (II')$$

wherein Ar has the meaning given previously, and M and M', which may be the same or different, each represents a leaving group, for example, a hydroxyl group, an alkyloxy or aryloxy group or an acid halide group, or M and M' together represent an acid anhydride group; and the aromatic dicarboxylic acids or derivatives thereof of the formula II' may optionally include sulphonated dicarboxylic acids or their derivatives;

(iii) at least 30 mole % of a polyol having at least 3 hydroxyl groups, having the formula III':

$$HO-CH_2-A-CH_2-OH \quad (III')$$

wherein A has the meaning given previously.

In the formulae I and I', X represents a hydrogen atom, or a capping group. A preferred capping group is a $C_{1-4}$ alkyl group, most preferably a methyl group. Alternative capping groups, either uncharged or charged, as described in the literature, are also possible.

In the formulae I and I', the value of n may suitably range from 2 to 50, more preferably from 6 to 30 and most preferably from 8 to 14.

These ranges correspond to an approximate molecular weight of the poly(ethylene glycol) monomer (calculated as the uncapped material) of from 88 to 2200, preferably from 264 to 1320 and most preferably from 352 to 616.

Poly(ethylene glycol) of lower molecular weight (n=14 and below) is especially preferred because the resulting polymers are biodegradable.

If desired, there may also be present minor amounts of units derived from poly(propylene glycol) or capped poly(propylene glycol).

Preferably, the monomer units of the formula III have the formula IIIa:

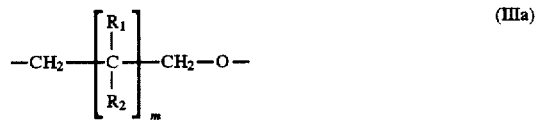

(IIIa)

wherein $R_1$ is H, OH or $C_{1-4}$ alkyl; $R_2$ is OH; m is an integer from 1 to 10; and where m is greater than 1, the groups $R_1$ and $R_2$ need not be the same at each occurrence of the group $CR_1R_2$.

More preferably, the monomer units have the formula IIIb:

(IIIb)

wherein m has the meaning given previously, and is preferably from 1 to 4, and more preferably is 1 or 2.

Preferred monomer units of the formula III are glycerol units or reduced monosaccharide units. Especially preferred monomer units of the formula IIIb are glyceryl (m=1) or threityl (m=2) moeities. The most preferred polyol monomer is glycerol.

Thus, the monomer units III are preferably obtainable from a polyol of the formula IIIa'

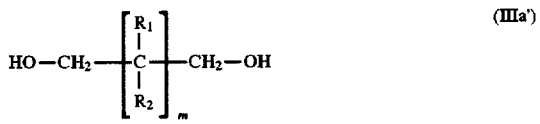

(IIIa')

wherein $R_1$, $R_2$ and m have the meanings given previously.

More preferably, the monomer units III are obtainable from a polyol of the formula IIIb':

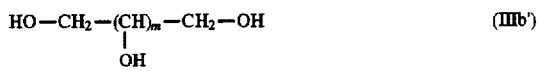

(IIIb')

m preferably being from 1 to 4 and more preferably 1 or 2 as previously indicated.

As previously indicated, preferred polyols of the formula III' are glycerol or reduced monosaccharides. Especially preferred polyols of the formula IIIb' are glycerol (m=1) or threitol (m=2), more especially glycerol.

In the aromatic dicarboxylic acid (ii), suitable Ar groups and aromatic dicarboxylic groups include the following:

| | |
|---|---|
| terephthalate | |
| isophthalate | |
| 1,4-phenoxymethylene | $-CH_2-O-C_6H_4-O-CH_2-$ |
| 4,4'-bisphenylene | $-C_6H_4-C_6H_4-$ |
| 2,2'-diphenylpropane | $-C_6H_4-\overset{\overset{CH_3}{\vert}}{\underset{\underset{CH_3}{\vert}}{C}}-C_6H_4-$ |
| 4,4'-diphenylene oxide | $-C_6H_4-O-C_6H_4-$ |
| sulphoisophthalate | |
| 4,4'-diphenylsulphone | $-C_6H_4-\overset{\overset{O}{\|}}{\underset{\underset{O}{\|}}{S}}-C_6H_4$ |

The most preferred unsulphonated dicarboxylic monomer is terephthalic acid, ie Ar is a 1,4-phenylene group $-C_6H_4-$ optionally in combination with isophthalic acid, generally in a minor amount.

As previously indicated polymers containing units of both unsulphonated and sulphonated monomers are also of great interest. The presence of an unsulphonated monomer is essential, while the presence of a sulphonated monomer is optional. The preferred combination is terephthalic acid, optionally plus isophthalic acid, and sulphoisophthalic acid.

Optional Aliphatic Dicarboxylic Monomer

If desired, the monomer mixture may additionally contain a minor amount, for example, from 0.2 to 10 mole %, preferably from 0.5 to 5 mole % and more preferably from 0.5 to 2 mole %, of an aliphatic dicarboxylic acid monomer, in order to increase hydrophobicity and reduce glass transition temperature. Preferred aliphatic monomers are $C_4$–$C_{10}$ dicarboxylic acids or derivatives thereof, acids having an even number of carbon atoms being especially preferred in order to optimise chain packing. An example of a suitable monomer is dimethyl adipate, providing adipic acid units in the polymer.

Monomer Ratios

Monomer ratios may vary widely provided that the mole percentage of units of the polyol (iii) is at least 30 mole %.

Preferred polymers consist essentially of:

(i) from 2 to 30 mole % of monomer units of the poly(ethylene glycol) and/or capped poly(ethylene glycol) (i), comprising from 0 to 30 mole % of uncapped glycol and from 0 to 30 mole % of capped glycol, (ii) from 10 to 50 mole % of monomer units of the aromatic dicarboxylic acid (ii), comprising from 2 to 50 mole % of monomer units of an unsulphonated aromatic dicarboxylic acid and from 0 to 15 wt % of monomer units of a sulphonated aromatic dicarboxylic acid, (iii) from 30 to 88 mole % of monomer units of the polyol (iii).

Especially preferred unsulphonated polymers of the invention consist essentially of:

(i) from 10 to 30 mole % of monomer units of the poly(ethylene glycol) and/or capped poly(ethylene glycol) (i), comprising from 0 to 30 mole % of uncapped glycol and from 0 to 30 mole % of capped glycol, (ii) from 30 to 50 mole % of monomer units of the aromatic dicarboxylic acid (ii), (iii) from 30 to 50 mole % of monomer units of the polyol (iii).

Especially preferred sulphonated polymers of the invention consist essentially of:

(i) from 2 to 10 mole % of monomer units of the poly(ethylene glycol) and/or capped poly(ethylene glycol) (i), comprising from 0 to 10 mole % of uncapped glycol and from 0 to 10 mole % of capped glycol, (ii) from 10 to 50 mole % of monomer units of the aromatic dicarboxylic acid (ii), comprising from 2 to 50 mole % of monomer units of an unsulphonated aromatic dicarboxylic acid and from 1 to 15 wt % of monomer units of a sulphonated aromatic dicarboxylic acid, (iii) from 50 to 88 mole % of monomer units of the polyol (iii).

Thus broadly preferred copolymers of the invention are obtainable from the condensation of a monomer mixture consisting essentially of:

(i) from 2 to 30 mole % of the poly(ethylene glycol) and/or capped poly(ethylene glycol) (i), comprising from 0 to 30 mole % of uncapped glycol and from 0 to 30 mole % of capped glycol, (ii) from 10 to 50 mole % of the aromatic dicarboxylic acid (ii), comprising from 2 to 50 mole % of an unsulphonated aromatic dicarboxylic acid and from 0 to 15 wt % of a sulphonated aromatic dicarboxylic acid, (iii) from 30 to 88 mole % of the polyol (iii).

Unsulphonated copolymers of the invention are preferably obtainable from the condensation of a monomer mixture consisting essentially of (i) from 10 to 30 mole % of the poly(ethylene glycol) and/or capped poly(ethylene glycol) (i), comprising from 0 to 30 mole % of uncapped glycol and from 0 to 30 mole % of capped glycol, (ii) from 30 to 50 mole % of an unsulphonated aromatic dicarboxylic acid (ii), (iii) from 30 to 50 mole % of the polyol (iii).

Sulphonated copolymers of the invention are preferably obtainable from the condensation of a monomer mixture consisting essentially of (i) from 2 to 10 mole % of monomer units of the poly(ethylene glycol) and/or capped poly(ethylene glycol) (i), comprising from 0 to 10 mole % of uncapped glycol and from 0 to 10 mole % of capped glycol, (ii) from 10 to 50 mole % of monomer units of the aromatic dicarboxylic acid (ii), comprising from 2 to 50 mole % of monomer units of an unsulphonated aromatic dicarboxylic acid and from 1 to 15 wt % of monomer units of a sulphonated aromatic dicarboxylic acid, (iii) from 50 to 88 mole % of monomer units of the polyol (iii).

Preferred Polymers

In preferred copolymers of the invention, the following combinations of monomer units may, for example, be present:

(i) units of the formula A:

at least in part present in the form of end units of the formula A':

wherein X is a hydrogen atom or a capping group, preferably a $C_{1-4}$ alkyl group and more preferably a methyl group, and (ii) units of the formula C:

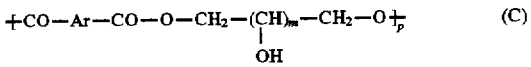

wherein p is from 1 to 50, preferably from 1 to 10; or units of the formula C':

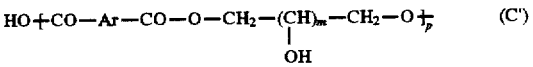

(iii) units of the formula B:

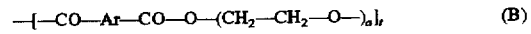

wherein t is from 1 to 50, preferably from 1 to 10; optionally present in part as end units of the formula B':

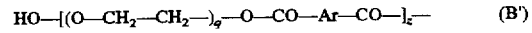

wherein z is from 1 to 50, preferably from 1 to 10.

Typical values of n, a and q are from 2 to 50, preferably from 6 to 30, and especially from 8 to 14.

The units A and A' are preferably poly(ethylene glycol) moieties, also known as poly(ethylene oxide) or poly (ethyleneoxy) moieties. Optionally corresponding units derived from poly(propylene glycol) may additionally be present. The end units A' are are optionally end-capped with a $C_{1-4}$ alkyl group, preferably a methyl group. Thus preferred units A' are derived from poly(ethylene glycol) methyl ether) ("methyl PEG").

The units C and C' are units of an ester of the aromatic dicarboxylic acid or acids (preferably terephthalic acid, optionally plus sulphoisophthalic acid) with the $C_{3-12}$ polyol (preferably glycerol or threitol). Thus preferred units C are poly(glyceryl terephthalate) (PGT) units and poly(threityl terephthalate) (PTT) units.

The units B and B' are units of an ester of poly(ethylene glycol) with the aromatic dicarboxylic acid (preferably terephthalic acid, optionally plus isophthalic acid and/or sulphoisophthalic acid). Thus preferred units B and B' are poly(ethylene glycol terephthalate) (POET) units.

Unlike the PET/POET polymers of the prior art, the polymers of the invention do not contain poly (ethylene terephthalate) (PET) units, or corresponding units derived from other aromatic dicarboxylic acids; that is to say, the monomers from which they are derived do not include ethylene glycol.

There are three especially preferred classes of polymer within the scope of the present invention:
(i) A'—B—C—A' type end-capped polyesters;
(ii) A'—C—A' type end-capped polyesters;
(iii) B'—C' type uncapped copolyesters.

Molecular Weights

Preferred polymers for use in liquid and particulate detergent compositions have molecular weights within the range of from 200 to 20 000, preferably from 300 to 10 000 and desirably from 400 to 5000.

Water Solubility and Rate of Dissolution

The polymers of the invention are highly water-soluble. Unlike the Permalose (Trade Mark) polymers of the prior art, they do not contain the long ethylene terephthalate blocks which produce material of low water solubility, thus reducing the overall solubility of the polymer. The Permalose polymers have the further disadvantage that at high temperatures the less water-soluble material tends to take up the more water-soluble material, so that overall solubility is further reduced by high temperature processing as may be needed, for example, when preparing detergent powders. This does not occur with the polymers of the invention which are highly water-soluble both at ambient temperatures and at elevated temperatures.

As previously indicated, the polymers of the invention also exhibit a substantially greater rate of dissolution in water than do known soil release copolyesters.

Without wishing to be bound by theory, we believe these advantageous properties may be attributed to the greater hydrophilicity of the polymers of the invention, compared with PET/POET polymers, due to the presence of free (secondary) hydroxyl groups.

Surprisingly, the presence of free (secondary) hydroxyl groups in the polyol monomer does not result in crosslinking to give insoluble material. Preferred polymers of the invention are substantially linear. However, polymers containing some degree of branching are within the scope of the invention.

Preparation of the Polymers

The polymers of the invention may be prepared by condensation of
(i)(a) an end-capped poly(ethylene glycol) and/or
(i)(b) poly(ethylene glycol),
(ii) the aromatic dicarboxylic acid HOOC—Ar—COOH or a suitable derivative ($C_{1-4}$ alkyl ester, acid halide, anhydride);
(iii) the chosen polyol in an amount of at least 30 mole %.

If the dicarboxylic acid is used in alkyl ester form, the reaction is suitably carried out in the presence of a base catalyst, at an elevated temperature, for example, 120°–180° C., and, if desired, under reduced pressure. The lower alcohol (normally methanol) generated during the reaction is distilled off.

Suitable catalysts include alkyl and alkaline earth metals, for example, lithium, sodium, calcium and magnesium, as well as transition and Group IIB metals, for example, antimony, manganese, cobalt and zinc, usually as oxides, carbonates or acetates. A preferred catalyst comprises antimony trioxide and calcium acetate.

The esters and oligomers produced in the condensation (ester interchange) reaction may then be polymerised to the desired molecular weight, by raising the temperature further, typically to 180°–250° C.

The degree of polymerisation may be monitored by gel permeation chromatography, NMR, and end-group titrations. Where other derivatives of the aromatic dicarboxylic acid are used as starting materials, other catalysts and reaction conditions may be appropriate.

Granules or Adjuncts

As previously indicated, the polymers of the invention may readily be combined with a suitable carrier material to form free-flowing heat-stable granules or adjuncts suitable for incorporation in, or admixture to, particulate detergent compositions.

Suitable carrier materials are inorganic salts. Inert salts such as sodium sulphate are preferred.

Deterrent Compositions

The copolymers of the present invention are suitable for incorporation into detergent compositions of all physical forms, for example, liquids, powders, gels, tablets and bars.

The polymers are suitably incorporated into detergent compositions in amounts of from 0.02 to 10 wt %, preferably from 0.1 to 3 wt %.

As previously indicated, for use in particulate detergent compositions the polymers of the invention may suitably be in granule or adjunct form.

Detergent compositions will generally contain detergent-active compounds and detergency builders, and may optionally contain bleaching components and other active ingredients to enhance performance and properties.

The detergent compositions of the invention will contain, as essential ingredients, one or more detergent-active compounds (surfactants) which may be chosen from soap and non-soap anionic, cationic, nonionic, amphoteric and zwitterionic detergent-active compounds, and mixtures thereof. Many suitable detergent-active compounds are available and are fully described in the literature, for example, in "Surface-Active Agents and Detergents", Volumes I and II, by Schwartz, Perry and Berch.

The preferred detergent-active compounds that can be used are soaps and synthetic non-soap anionic and nonionic compounds. The total amount of surfactant present may suitably range from 5 to 40 wt %.

Anionic surfactants are well-known to those skilled in the art. Examples include alkylbenzene sulphbnates, particularly linear alkylbenzene sulphonates having an alkyl chain length of $C_8$–$C_{15}$; primary and secondary alkylsulphates, particularly $C_8$–$C_{15}$ primary alkyl sulphates; alkyl ether sulphates; olefin sulphonates; alkyl xylene sulphonates; dialkyl sulphosuccinates; and fatty acid ester sulphonates. Sodium salts are generally preferred.

The polymers of the present invention are especially suitable for use in compositions containing anionic sulphonate and sulphate type surfactants, for example, primary alkyl sulphates, alkyl ether sulphates, alkylbenzene sulphonates, and mixtures of these.

Nonionic surfactants that may be used include the primary and secondary alcohol ethoxylates, especially the $C_8$–$C_{20}$ aliphatic alcohols ethoxylated with an average of from 1 to 20 moles of ethylene oxide per mole of alcohol, and more especially the $C_{10}$–$C_{15}$ primary and secondary aliphatic alcohols ethoxylated with an average of from 1 to 10 moles of ethylene oxide per mole of alcohol.

Non-ethoxylated nonionic surfactants include alkylpolyglycosides, glycerol monoethers, and polyhydroxyamides (glucamide).

Especially preferred are ethoxylated nonionic surfactants, alkylpolyglycosides, and mixtures of these.

As well as the non-soap surfactants listed above, detergent compositions of the invention may also advantageously contain fatty acid soap.

The detergent compositions of the invention will generally also contain one or more detergency builders. The total amount of detergency builder in the compositions will suitably range from 5 to 80 wt %, preferably from 10 to 60 wt %.

Inorganic builders that may be present include sodium carbonate, if desired in combination with a crystallisation seed for calcium carbonate, as disclosed in GB 1 437 950 (Unilever); crystalline and amorphous aluminosilicates, for example, zeolites as disclosed in GB 1 473 201 (Henkel), amorphous aluminosilicates as disclosed in GB 1 473 202 (Henkel) and mixed crystalline/amorphous aluminosilicates as disclosed in GB 1 470 250 (Procter & Gamble); and layered silicates as disclosed in EP 164 514B (Hoechst). Inorganic phosphate builders, for example, sodium orthophosphate, pyrophosphate and tripolyphosphate, may also be present, but on environmental grounds those are no longer preferred.

The detergent compositions of the invention preferably contain an alkali metal, preferably sodium, aluminosilicate builder. Sodium aluminosilicates may generally be incorporated in amounts of from 10 to 70% by weight (anhydrous basis), preferably from 25 to 50 wt %.

The zeolite may be the commercially available zeolite 4A now widely used in laundry detergent powders. Other zeolites that may be used include zeolites X and Y.

However, according to a preferred embodiment of the invention, the zeolite builder incorporated in the compositions of the invention is maximum aluminium zeolite P (zeolite MAP) as described and claimed in EP 384 070A (Unilever). Zeolite MAP is defined as an alkali metal aluminosilicate of the zeolite P type having a silicon to aluminium ratio not exceeding 1.33. Especially preferred is zeolite MAP having a silicon to aluminium ratio not exceeding 1.07, more preferably about 1.00. The calcium binding capacity of zeolite MAP is generally at least 150 mg CaO per g of anhydrous material.

Organic builders that may be present include polycarboxylate polymers such as polyacrylates, acrylic/maleic copolymers, and acrylic phosphinates; monomeric polycarboxylates such as citrates, gluconates, oxydisuccinates, glycerol mono-, di- and trisuccinates, carboxymethyloxysuccinates, carboxymethyloxymalonates, dipicolinates, hydroxyethyliminodiacetates, alkyl- and alkenylmalonates and succinates; and sulphonated fatty acid salts. This list is not intended to be exhaustive.

Detergent compositions according to the invention may also suitably contain a bleach system, which may contain peroxy bleach compounds, for example, inorganic persalts or organic peroxyacids, capable of yielding hydrogen peroxide in aqueous solution.

Suitable peroxy bleach compounds include organic peroxides such as urea peroxide, and inorganic persalts such as the alkali metal perborates, percarbonates, perphosphates, persilicates and persulphates.

Preferred inorganic persalts are sodium perborate monohydrate and tetrahydrate, and sodium percarbonate. The peroxy bleach compound is suitably present in an amount of from 5 to 35 wt %, preferably from 10 to 25 wt %.

The peroxy bleach compound may be used in conjunction with a bleach activator (bleach precursor) to improve bleaching action at low wash temperatures. The bleach precursor is suitably present in an amount of from 1 to 8 wt %, preferably from 2 to 5 wt %.

A bleach stabiliser (heavy metal sequestrant) may also be present. Suitable bleach stabilisers include ethylenediamine tetraacetate (EDTA) and the polyphosphonates such as Dequest (Trade Mark), EDTMP.

Other materials that may be present in detergent compositions of the invention include inorganic salts such as sodium carbonate, sodium sulphate or sodium silicate; antiredeposition agents such as cellulosic polymers; fluorescers; anti-dye-transfer polymers such as polyvinyl pyrrolidone; inorganic salts such as sodium sulphate; lather control agents or lather boosters as appropriate; detergent enzymes (protease, lipase, cellulase, amylase); dyes; coloured speckles; perfumes; foam controllers; and fabric softening compounds. This list is not intended to be exhaustive.

EXAMPLES

The invention is further illustrated by the following non-limiting Examples, in which parts and percentages are by weight unless otherwise stated.

EXAMPLES 1 to 5

Preparation of Polymers

Example 1

Preparation of capped copolymer of poly(ethylene glycol methyl ether), poly(ethylene glycol), terephthalic acid and glycerol

| Reactants | g | mole | mole % |
| --- | --- | --- | --- |
| Poly(ethylene glycol methyl ether) (MW 2000) | 30.0 | 0.015 | 4.22 |
| Poly(ethylene glycol) (MW 1500) | 60.0 | 0.04 | 11.27 |
| Dimethyl terephthalate | 25.6 | 0.13 | 36.62 |
| Glycerol | 15.5 | 0.17 | 47.89 |
| Antimony trioxide | 0.7 | | |
| Calcium acetate | 0.7 | | |
| 2,6-di-tert-butyl-methylphenol (BHT) | 0.1 | | |

The above ingredients were charged into a flanged reactor flask provided with bladed stirrer, thermometer to register the reactant temperature, O-spot nitrogen inlet, and Claisen still-head with condenser for the distillation of methanol. The temperature was first raised to 150°–160° C. (pot temperature) to melt the solid reactants and thoroughly disperse the catalyst. The temperature was then raised to 175° C. and held for 22 hours, before increasing it further to 200° C. and holding an additional 11 hours. Much dimethyl terephthalate sublimed onto the cooler upper part of the reactor wall during this stronger heating period. This was periodically remelted back into the reaction. Approximately 25% of the theoretical amount of methanol distilled up to this stage.

While still molten, the somewhat cooled reaction mixture was transferred to a Kugelrohr bulb, then reheated to 200° C. at 0.1 torr vacuum. This temperature was held for 1 hour to 'complete' the polycondensation. The total amount of methanol collected indicated a conversion of approximately 80%.

The polyester thus obtained was a waxy solid, melting at 35°–45° C. to a clear liquid. At 1% in water it gave a reversible cloud temperature of 62°–63° C. Its apparent molecular weight by GPC (THF) vs polystyrene standards was $M_n$ 5600, $M_w$ 11000. The $^1$H NMR spectrum (CDCl$_3$) showed major peaks centred at 8.1 and 3.6 ppm assignable to terephthalate Ar—H's and ethyleneoxy respectively. A smaller singlet at 3.4 ppm correlated with the presence of methoxyl groups.

Example 1a

A polymer having molecular weights of $M_n$=2750, $M_w$ 4800 was prepared from the same reactants, in the same quantities, by a process as described in Example 1. Its cloud point was 61° C., and its —(—EO—)$_n$— to Ar—H ratio was 17:1.

Example 1b

A polymer having molecular weights of $M_n$=2600, $M_w$=4600 was prepared from the same reactants, in the same quantities, by a process as described in Example 1. Its cloud point was 61°–62° C., and its —(—EO—)$_n$— to Ar—H— ratio was 20:1.

Example 2

Preparation of capped copolymer of poly(ethylene glycol methyl ether), terephthalic acid and glycerol

| Reactants | g | mole | mole % |
|---|---|---|---|
| Poly(ethylene glycol methyl ether) MW 550 | 44.0 | 0.08 | 24.24 |
| Dimethyl terephthalate | 21.6 | 0.11 | 33.33 |
| Glycerol | 12.5 | 0.14 | 42.42 |
| Antimony trioxide | 0.2 | | |
| Calcium acetate | 0.2 | | |
| BHT | 0.005 | | |

The preparation was carried out as in Example 1. Approximately 10% of unreacted dimethyl terephthalate was distilled off at the Kugelrohr step, indicating conversion of approximately 90%. The oligomeric product was a brown viscous liquid. At 1% in water, it gave a reversible cloud point of 54° C. Its molecular weight by GPC in THF was $M_n$ 1550, $M_w$ 2900. The $^1$H NMR spectrum (CDCl$_3$) was generally similar to that of the polymer of Example 1, except that the —(—EO—)$_n$— to Ar—H ratio was 11:1.

Example 2a

A polymer was prepared from the same reactants on a larger scale, as shown below, by a process as described in Example 2.

| Monomer | mole | mole % |
|---|---|---|
| Poly(ethylene glycol methyl ether) MW 550 | 0.16 | 24.24 |
| Dimethyl terephthalate | 0.22 | 33.33 |
| Glycerol | 0.28 | 42.42 |

The molecular weights were $M_n$=930, $M_w$=1450. The cloud point was 29° C., and the —(—EO—)$_n$— to Ar—H ratio was 10:1.

Example 2b

A polymer was prepared from the same reactants, in the quantities used in Example 2a, by a process as described in Example 2.

The molecular weights were $M_n$=1600, $M_w$=2900. The cloud point was 56° C., and the —(—EO—)$_n$— to Ar—H ratio was 8:1.

Example 3

Preparation of capped copolymer of poly(ethylene glycol methyl ether), terephthalic acid, and threitol A polymer was prepared by the method of Example 2, but the glycerol was replaced by an equivalent amount of D,L-threitol. The polymer had a molecular weight ($M_w$) of 2200.

Example 3a

Preparation of capped copolymer of poly(ethylene glycol methyl ether), terephthalic acid, and sorbitol A polymer was prepared by the method of Example 2, from the following monomers:

| Monomer | Mole | Mole % |
|---|---|---|
| Poly(ethylene glycol) methyl ether (MW 550) | 0.03 | 27.27 |
| Dimethyl terephthalate | 0.04 | 36.36 |
| Sorbitol | 0.04 | 36.36 |

The molecular weights were Mn=1300, Mw=2200, and the —(—EO—)$_n$— to Ar—H ratio was 11:1.

Example 4

Preparation of uncapped copolymer of poly(ethylene glycol), terephthalic acid and glycerol An uncapped polymer was prepared by the method of Example 1, the reactants being polyethylene glycol, terephthalic acid and glycerol in the following amounts and proportions:

| Monomer | mole | mole % |
|---|---|---|
| Poly(ethylene glycol) MW 600 | 0.105 | 25.30 |
| Dimethyl terephthalate | 0.15 | 36.15 |
| Glycerol | 0.16 | 38.55 |

The polymer had molecular weights $M_n$=1700, $M_w$=3200. Its —(—EO—)$_n$— to Ar—H ratio was 9:1.

Example 4a

A polymer was prepared by a process as described in Example 4, the reactants being polyethylene glycol, terephthalic acid and glycerol in the following amounts and proportions:

| Monomer | mole | mole % |
|---|---|---|
| Poly(ethylene glycol) MW 600 | 0.27 | 25.71 |
| Dimethyl terephthalate | 0.38 | 36.19 |
| Glycerol | 0.40 | 38.10 |

The molecular weights were $M_n$=1600, $M_w$=2850. The —(—EO—)$_n$— to Ar—H ratio was 9:1.

Example 4b

A polymer was prepared by a process as described in Example 4, the reactants being polyethylene glycol, terephthalic acid and glycerol in the following amounts and proportions:

| Monomer | mole | mole % |
| --- | --- | --- |
| Poly(ethylene glycol) MW 600 | 0.03 | 25.64 |
| Dimethyl terephthalate | 0.042 | 35.90 |
| Glycerol | 0.045 | 38.46 |

The molecular weights were $M_n$=2000, $M_w$=4250. The —(—EO—)$_n$— to Ar—H ratio was 13:1.

Example 4c

A polymer was prepared by a process as described in Example 4, the reactants being polyethylene glycol, terephthalic acid and glycerol in the following amounts and proportions:

| Monomer | mole | mole % |
| --- | --- | --- |
| Poly(ethylene glycol) MW 600 | 0.02 | 21.74 |
| Dimethyl terephthalate | 0.042 | 45.65 |
| Glycerol | 0.03 | 32.61 |

The molecular weights were $M_n$=2500, $M_w$=5550. The —(—EO—)$_n$— to Ar—H ratio was 6.75:1.

Example 5

Preparation of copolymer of poly(ethylene glycol), terephthalic acid, 5-sulphoisophthalic acid sodium salt, glycerol and adipic acid

| Reactants | g | mole | mole % |
| --- | --- | --- | --- |
| Poly(ethylene glycol) (MW 600) | 20.0 | 0.033 | 4.85 |
| Dimethyl terephthalate | 38.8 | 0.02 | 2.94 |
| Dimethyl 5-sulphoisophthalate Na salt | 19.8 | 0.067 | 9.85 |
| Dimethyl adipate | 1.7 | 0.01 | 1.47 |
| Glycerol | 50.6 | 0.55 | 80.88 |
| Antimony trioxide | 0.01 | | |
| Calcium acetate | 0.4 | | |
| Phosphorous acid | 0.2 | | |

The above ingredients, apart from the phosphorous acid, were charged into a flanged reactor flask provided with bladed stirrer, thermometer to register the reactant temperature, O-spot nitrogen inlet, and Claisen still-head with condenser for the distillation of methanol.

The temperature was first raised to 140°–150° C. (pot temperature) to melt the solid reactants and thoroughly disperse the catalyst. The temperature was then raised to 190°–200° C. and held for 12 hours. Dimethyl terephthalate which sublimed onto the cooler part of the reactor wall during this stronger heating period, was periodically remelted back into the reaction. Approximately 25% of the theoretical amount of methanol distilled up to this stage.

The pre-condensate was then cooled and the phosphorous acid antioxidant in a little water (0.5 ml) added, before reheating to 240° C. over 4 hours at a vacuum of ~20 torr. While still molten, the somewhat cooled reaction mixture was transferred to a Kugelrohr bulb, then heated to 250° C. at 0.1 torr vacuum for an hour to "complete" the polycondensation.

The polyester sulphonate thus produced was a fully water-soluble, hard and brittle resin. It had no recognisable cloud point at 1 wt % in water.

Its apparent molecular weight by aqueous gel permeation chromatography against polyethylene glycol standards was $M_n$ 7700, $M_w$ 20 300.

The $^1$H NMR spectrum ($D_2O$) showed major peakes centered at 8.4 and 7.6 ppm assignable to the terephthalate/isophthalate Ar—H's, and at 3.6 ppm assignable to ethyleneoxy groups. Other peaks at around 4.3 ppm correlated with the glycerol derived chain links.

Example 5a

A sulphonated polymer was prepared as described in Example 5, from the following monomers in the following amounts and proportions:

| Monomers | mole | mole % |
| --- | --- | --- |
| Poly(ethylene glycol) (MW 400) | 0.028 | 3.83 |
| Dimethyl terephthalate | 0.20 | 27.40 |
| Isophthalic acid | 0.023 | 3.15 |
| Dimethyl 5-sulphoisophthalate Na salt | 0.012 | 1.64 |
| Glycerol | 0.467 | 63.97 |

The molecular weights were $M_n$=1300, $M_w$=1800.

Example 5b

A sulphonated polymer was prepared as described in Example 5, from the following monomers in the following amounts and proportions:

| Monomers | mole | mole % |
| --- | --- | --- |
| Poly(ethylene glycol) (MW 400) | 0.034 | 3.83 |
| Dimethyl terephthalate | 0.20 | 22.54 |
| Isophthalic acid | 0.028 | 3.16 |
| Dimethyl 5-sulphoisophthalate Na salt | 0.057 | 6.42 |
| Glycerol | 0.568 | 64.04 |

The molecular weights were $M_n$=1500, $M_w$=1900.

Example 6

Water Solubility

In this Example, the percentage weights of water-soluble and water-insoluble materials were determined for the polymers of Examples 1, 2, 3 and 4, and for a commercially available polymer, Permalose (Trade Mark) ex ICI (Comparative Example A). The determination of soluble and insoluble fractions was carried out by:

preparing a 1 wt % aqueous dispersion of the polymer in water (for Comparative Example A, by dilution of the commercially available aqueous dispersion)

stirring the dispersion for two hours, centrifuging the dispersion for 30 minutes at 25000 revs/min and decanting the clear layer, freeze drying and weighing the decanted clear solution (A) and the dispersed material (B) to determine the percentages of water-soluble material A*100%/(A+B) and water-insoluble material B*100%/(A+B).

The results were as follows:

| | Soluble | Insoluble |
| --- | --- | --- |
| Example 1 | 100 wt % | — |
| Example 2 | 100 wt % | — |
| Example 3 | 100 wt % | — |
| Example 4 | 100 wt % | — |
| Comparative Example A | 63–65 wt % | 35–37 wt % |

The polymers of Examples 2 and 4 also gave clear solutions at a concentration of 10 wt %, while the polymer of Example 1 gave a slightly cloudy solution.

EXAMPLES 7 to 11

Soil Release and Detergency

Example 7

Soil Release

A concentrated powder of the following composition was used to determine the influence of the soil release polymers of Examples 1 to 3, and a commercially available PET/POET polymer, Permalose (Trade Mark) ex ICI, on the removal of triolein from polyester fabric.

|  | % |
|---|---|
| Primary alkyl sulphate (cocoPAS) | 6.13 |
| Nonionic surfactant (7EO) | 6.13 |
| Nonionic surfactant (3EO) | 7.73 |
| Zeolite MAP (anhydrous basis) | 38.47 |
| Hardened tallow soap | 2.13 |
| Sodium carbonate | 1.05 |
| Sodium carboxymethylcellulose (70%) | 0.97 |
| Sodium percarbonate | 20.50 |
| TAED (83% granule) | 4.75 |
| EDTMP (Dequest (Trade Mark) 2047) | 0.37 |
| Enzymes | 1.75 |
| Antifoam/fluorescer granule | 3.00 |
| Soil release polymer | 0 or 1.00 |
| Minor ingredients | to 100.00 |

Soil release was measured using radio-labelled triolein as a soil and measuring the amount of triolein released into the wash solution by scintillation counting. Polyester cloths were washed for 20 minutes in the test formulations (with or without soil release polymer at 1%) at 5 g/l at 40° C. in 24°FH (calcium only) water. The cloths after rinsing were air dried and then soiled with the radio labelled triolein.

A subsequent wash was carried out under the same conditions as the first wash and the removal of the triolein measured. This detergency result shows the soil release benefit for the soil release polymer.

| Polymer | % Detergency |
|---|---|
| None | 21.6 |
| Permalose | 61.3 |
| Example 1 | 86.6 |
| Example 2 | 92.4 |
| Example 3 | 83.0 |

Example 8

Soil Release

Using the same powder and conditions as in Example 7, three polymers of the invention were examined, at two different levels (0.5% and 1.0% in the formulation) for soil release (fabric washed in product, soiled, then rewashed in product). In these experiments the fabrics were washed in the test formulations for 20 minutes and then soiled and rewashed in the test formulation for varying lengths of time.

Results at 0.5 wt % Polymer

| Wash time (min) | No. polymer | % triolein removal |  |  |
|---|---|---|---|---|
|  |  | Ex 1 | Ex 2 | Ex 4 |
| 1 | 0.92 | 2.3 | 7.0 | 2.8 |
| 3 | 2.21 | 9.0 | 26.4 | 12.0 |
| 6 | 4.11 | 17.0 | 43.6 | 23.4 |
| 10 | 6.20 | 28.1 | 52.7 | 33.7 |
| 20 | 9.78 | 41.5 | 66.5 | 50.8 |

Results at 1.0 wt % Polymer

| Wash time (min) | No. polymer | % triolein removal |  |  |
|---|---|---|---|---|
|  |  | Ex 1 | Ex 2 | Ex 4 |
| 1 | 0.92 | 26.0 | 25.5 | 12.8 |
| 3 | 2.21 | 43.0 | 44.5 | 32.9 |
| 6 | 4.11 | 55.3 | 57.7 | 48.5 |
| 10 | 6.20 | 64.5 | 67.6 | 62.2 |
| 20 | 9.78 | 78.0 | 80.0 | 76.5 |

Further experiments were carried out to show the effect of polymer concentration in the 20 minute wash:

| % polymer | % triolein removal |  |  |
|---|---|---|---|
|  | Ex 1 | Ex 2 | Ex 4 |
| 0 | 9.8 | 8.9 | 7.3 |
| 0.5 | 41.5 | 66.5 | 50.9 |
| 1.0 | 78.0 | 80.0 | 76.5 |
| 1.5 | 76.6 | 90.0 | 89.8 |
| 2.0 | 88.5 | 91.0 | 88.8 |
| 3.0 | 91.5 | 90.7 | 94.5 |

Example 9

Single Wash Detergency

Experiments were carried out, using the same powder formulation as in earlier Examples, to determine whether the soil release polymers of Examples 1a, 1b, 2a, 2b and 4a at 1% had any effect on detergency in a single wash. The procedure was therefore to soil the cloths and then wash in the test formulations. For comparison, the commercial polymer Permalose (Trade Mark) TM (molecular weight 7288) was also tested. The results were as follows:

| Polymer | % triolein removal |
|---|---|
| No polymer | 13.7 |
| Permalose | 68.4 |
| Example 1a | 51.7 |
| Example 1b | 57.1 |
| Example 2a | 59.4 |
| Example 2b | 70.0 |
| Example 4a | 64.9 |

Example 10

Single Wash Detergency

Single-wash detergencies were determined for the polymers of Examples 1, 2 and 4 at various concentrations in the product. Detergency results were as follows:

Results at 0.5 wt % Polymer

| Wash time (min) | No. polymer | % triolein removal | | |
|---|---|---|---|---|
| | | Ex 1 | Ex 2 | Ex 4 |
| 1 | 2.85 | 3.8 | 5.3 | 6.1 |
| 3 | 4.27 | 8.7 | 14.5 | 12.8 |
| 6 | 6.10 | 16.3 | 27.4 | 23.0 |
| 10 | 8.15 | 24.4 | 38.8 | 32.6 |
| 20 | 12.23 | 36.2 | 49.0 | 46.8 |

Results at 1.0 wt % Polymer

| Wash time (min) | No. polymer | % triolein removal | | |
|---|---|---|---|---|
| | | Ex 1 | Ex 2 | Ex 4 |
| 1 | 2.85 | 4.4 | 5.0 | 5.0 |
| 3 | 4.27 | 11.6 | 10.7 | 17.8 |
| 6 | 6.10 | 20.9 | 24.6 | 24.8 |
| 10 | 8.15 | 28.1 | 33.6 | 38.0 |
| 20 | 12.23 | 41.2 | 49.5 | 63.9 |

Further experiments were carried out to show the effect of polymer concentration in the 20 minute wash:

| % polymer | % triolein removal | | |
|---|---|---|---|
| | Ex 1 | Ex 2 | Ex 4 |
| 0 | 12.2 | 15.2 | 13.7 |
| 0.3 | 29.7 | 44.8 | 29.1 |
| 0.5 | 36.2 | 49.0 | 46.8 |
| 1.0 | 41.2 | 49.5 | 63.9 |
| 2.0 | 59.2 | 72.7 | 58.5 |
| 3.0 | 63.5 | 73.2 | 66.4 |

Example 11
Soil Release and Detergency

Soil release and single wash detergency were assessed as in previous Examples, but using a different detergent formulation:

| | % |
|---|---|
| Primary alkyl sulphate (cocoPAS) | 9.17 |
| Nonionic surfactant (7EO), linear | 5.93 |
| Nonionic surfactant (3EO), linear | 3.95 |
| Hardened tallow soap | 1.55 |
| Zeolite MAP (anhydrous basis) | 32.18 |
| Sodium citrate (2aq) | 4.25 |
| Sodium carbonate (light) | 2.30 |
| Fluorescer | 0.05 |
| Sodium carboxymethylcelluose (70%) | 0.88 |
| Sodium percarbonate (AvO$_2$ 13.25) | 20.50 |
| TAED (83% granule) | 6.50 |
| EDTMP (Dequest* 2047) | 0.42 |
| Protease (Maxacal* CX600k 2019 GU/mg) | 1.50 |
| Lipase (Lipolase* 100T 287 LU/mg) | 0.25 |
| Amylase (Termamyl* 60T 4.3 MU/mg) | 0.05 |
| Antifoam/fluorescer granule | 4.00 |
| Sodium bicarbonate | 1.00 |
| Perfume | 0.45 |
| Soil release polymer (see below) | 0 or 1 |
| Minor ingredients | to 100.00 |

*Trade Mark

The product dosage was 4 g/l. The comparative polymers used were Permalose (Trade Mark) ex ICI, and Aquaperle (Trade Mark) 3991 ex ICI, both commercial PET/POET polymers.

| Polymer | Single Wash (soil-wash) | Multi-wash (wash-soil-wash) |
|---|---|---|
| No polymer | 9.6 | 9.6 |
| Permalose | 59.2 | — |
| Aquaperle 3991 | 66.9 | 79.9 |
| Example 1 | 42.6 | 44.5 |
| Example 1a | 35.4 | 44.2 |
| Example 2 | 55.9 | 72.8 |
| Example 2a | 37.7 | 33.6 |
| Example 2b | 63.8 | 65.3 |
| Example 4 | 38.1 | 39.1 |
| Example 4a | 49.5 | 31.3 |
| Example 4c | 41.2 | 35.4 |
| Example 5 | 71.8 | 87.7 |
| Example 5a | 62.8 | 83.6 |
| Example 5b | 35.2 | 50.7 |

The sulphonated polymers of Examples 5 and 5a gave especially good results.

Example 12

Comparative Examples B and C Granular Adjuncts

Granular adjuncts for use in particulate detergent compositions were prepared by mixing various polymers with sodium sulphate. Where the polymers were in dilute aqueous solution or dispersion form, the adjuncts were prepared by adding sodium sulphate to the solution or dispersion, filtering off solid material, adding excess sodium sulphate, then air drying at ambient temperature.

Granules were prepared to the following formulations:

| Example | Polymer | | Sodium sulphate |
|---|---|---|---|
| 12 | Polymer of Ex 2a | 9.1 | 90.9 |
| B | Permalose | 21.8 | 78.2 |
| C | Repel-o-Tex* | 50.0 | 50.0 |

*Trade Mark, ex Rhone-Poulenc Chimie

Tergotometer washes were carried out using the formulation and wash regime of Example 7, the polymer level again being 1 wt %. Results were expressed as delivery of detergency as a function of time (radio-labelled triolein removal after a given time, as a percentage of the triolein removal when the adjunct was fully dissolved). Delivery of detergency was measured after a single wash, as in Example 9. The results were as follows.

Example % Detergency delivered after

| Example | % Detergency delivered after | |
|---|---|---|
| | 6 minutes | 20 minutes |
| 12 | 98.5 | 100.0 |
| B | 80.0 | 96.0 |
| C | 89.6 | 97.0 |

Example 13

This Example shows the use of a soil release polymer in accordance with the present invention in a liquid detergent composition:

| | % |
|---|---|
| Linear alkylbenzene sulphonate (as acid) | 16.5 |
| Nonionic surfactant 7EO | 4.5 |
| Nonionic surfactant 3EO | 4.5 |
| Oleic-rich fatty acid[1] | 4.5 |
| Zeolite 4A | 15.0 |
| Citric acid | 8.23 |
| Potassium hydroxide | 10.34 |
| Decoupling polymer[2] | 1.0 |
| Glycerol | 2.0 |
| Borax | 1.5 |
| Silicone/silica compound[3] | 0.3 |
| Perfume | 0.5 |
| Fluorescer | 0.08 |
| Enzymes | 0.91 |
| Soil release polymer | 1.00 |
| Water and minor ingredients | to 100.00 |

[1]PRIOLENE (Trade Mark) 6907 ex Unichema
[2]Narlex (Trade Mark) DC1
[3]DB100 ex Dow Corning

We claim:

1. A water-soluble copolymer providing soil release properties when incorporated in a laundry detergent composition, the copolymer comprising:

(i) from 2 to 30 mole % of monomer units of poly (ethylene glycol) and/or capped poly (ethylene glycol) having the formula I $$—O—(CH_2—CH_2—O)_n—$$ (I)

and/or the formula Ia:

$$X—O—(CH_2—CH_2—O)_n—$$ (Ia)

wherein X is a hydrogen atom or a capping group and n is an integer; comprising from 0 to 30 mole % of uncapped glycol and from 0 to 30 mole % of capped glycol, (ii) from 10 to 50 mole % of monomer units of one or more aromatic dicarboxylic acids having the formula II $$—CO—AR—CO—O—$$ (II)

wherein Ar is a bifunctional aromatic group, optionally including units in which Ar is sulphonated; comprising from 20 to 50 mole % of monomer units of an unsulphonated aromatic dicarboxylic acid and from 0 to 15 wt % of monomer units of a sulphonated aromatic dicarboxylic acid, (iii) from 30 to 88 mole % of monomer units of a polyol having at least 3 hydroxyl groups, having the formula III:

$$—CH_2—A—CH_2—O—$$ (III)

wherein A is a bifunctional group containing at least 1 carbon atom and at least 1 hydroxyl group.

2. A copolymer as claimed in claim 1, consisting essentially of (i) from 10 to 30 mole % of monomer units of the poly (ethylene glycol) and/or capped poly(ethylene glycol) (i), comprising from 0 to 30 mole % of uncapped glycol and from 0 to 30 mole % of capped glycol, (ii) from 30 to 50 mole % of monomer units of unsulphonated aromatic dicarboxylic acid (ii), (iii) from 30 to 50 mole % of monomer units of the polyol (iii).

3. A copolymer as claimed in claim 1, wherein in the formula I X represents a hydrogen atom or a $C_{1-4}$ alkyl group.

4. A copolymer as claimed in claim 1, wherein in the formula I n is an integer from 2 to 50.

5. A copolymer as claimed in claim 4, wherein in the formula I n is an integer from 8 to 14.

6. A copolymer as claimed in claim 1, wherein the monomer units of the formula III have the formula IIIa:

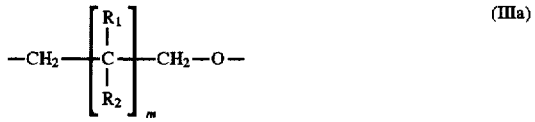

wherein $R_1$ is H, OH or $C_{1-4}$ alkyl; $R_2$ is OH; m is an integer from 1 to 10; and where m is greater than 1, the groups $R_1$ and $R_2$ need not be the same at each occurrence of the group $CR_1R_2$.

7. A copolymer as claimed in claim 6, wherein the monomer units of the formula IIIa have the formula IIIb:

$$—CH_2—(CH)_m—CH_2—O—$$
$$\phantom{—CH_2—(}|\phantom{CH)_m—CH_2—O—}$$
$$\phantom{—CH_2—(CH)_m}OH\phantom{—CH_2—O—}$$ (IIIb)

wherein m has the meaning given in claim 6.

8. A copolymer as claimed in claim 6, wherein in the formula IIIb m is from 1 to 4.

9. A copolymer as claimed in claim 6, wherein the unit of the formula III is a glycerol unit.

10. A copolymer as claimed in claim 1, wherein the monomer units (ii) comprise terephthalate units and optionally sulphoisophthalate units.

11. A water-soluble copolymer providing soil release properties when incorporated in a laundry detergent composition, the copolymer comprising:

(i) from 2 to 10 mole % of monomer units of poly (ethylene glycol) and/or capped poly(ethylene glycol) having the formula I $$—O—(CH_2—CH_2—O)_n—$$ (I)

and/or the formula Ia:

$$X—O—(CH_2—CH_2—O)_n—$$ (Ia)

wherein X is a hydrogen atom or a capping group and n is an integer; comprising from 0 to 10 mole % of uncapped glycol and from 0 to 10 mole % of capped glycol, (ii) from 10 to 50 mole % of monomer units of one or more aromatic dicarboxylic acids having the formula II $$—CO—AR—CO—$$ (II)

wherein Ar is a bifunctional aromatic group, optionally including units in which Ar is sulphonated; comprising from 2 to 50 mole % of monomer units of an unsulphonated aromatic dicarboxylic acid and from 1 to 15 wt % of monomer units of a sulphonated aromatic dicarboxylic acid, (iii) from 50 to 88 mole % of monomer units of a polyol having at least 3 hydroxyl groups, having the formula III:

$$—CH_2—A—CH_2—O—$$ (II)

wherein A is a bifunctional group containing at least 1 carbon atom and at least 1 hydroxyl group.

12. A water-soluble copolymer providing soil release properties when incorporated in a laundry detergent composition, which copolymer is a copolyester obtainable from the condensation of
(i) from 2 to 30 mole %, in total, of poly(ethylene glycol) and/or poly(ethylene glycol) methyl ether, comprising from 0 to 30 mole % of poly(ethylene glycol) and from 0 to 30 mole % of poly(ethylene glycol) methyl ether;
(ii) from 10 to 50 mole % of aromatic dicarboxylic acid comprising from 2 to 50 mole % of terephthalic acid, or an alkyl or aryl ester, anhydride or acid halide thereof and from 0 to 15 mole % of sulphoisophthalic acid, or an alkyl or aryl ester, anhydride or acid halide thereof, and
(iii) from 30 to 88 mole % of glycerol.

13. A granular adjunct suitable for incorporation into a particulate detergent composition, which comprises on a particulate carrier material, a copolymer comprising:
(i) monomer units of poly (ethylene glycol) and/or capped poly (ethylene glycol) having the formula I

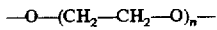

$$—O—(CH_2—CH_2—O)_n— \quad (I)$$

and/or the formula Ia:

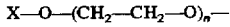

$$X—O—(CH_2—CH_2—O)_n— \quad (Ia)$$

wherein X is a hydrogen atom or a capping group and n is an integer;
(ii) monomer units of one or more aromatic dicarboxylic acids having the formula II

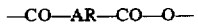

$$—CO—AR—CO—O— \quad (II)$$

wherein Ar is a bifunctional aromatic group, optionally including units in which Ar is sulphonated;
(iii) at least 30 mole % of monomer units of a polyol having at least 3 hydroxyl groups, having the formula III:

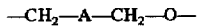

$$—CH_2—A—CH_2—O— \quad (III)$$

wherein A is a bifunctional group containing at least 1 carbon atom and at least 1 hydroxyl group.

14. A detergent composition for washing fabrics, which comprises:

(i) from 2 to 50 wt % of an organic surfactant component comprising one or more anionic, nonionic, cationic, amphoteric or zwitterionic surfactants,
(ii) from 0 to 80 wt % of a builder component comprising one or more inorganic detergency builders,
(iii) a soil release component comprising an effective amount of a polymer comprising:

(i) monomer units of poly (ethylene glycol) and/or capped poly (ethylene glycol) having the formula I

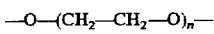

$$—O—(CH_2—CH_2—O)_n— \quad (I)$$

and/or the formula Ia:

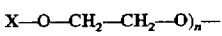

$$X—O—(CH_2—CH_2—O)_n— \quad (Ia)$$

wherein X is a hydrogen atom or a capping group and n is an integer;
(ii) monomer units of one or more aromatic dicarboxylic acids having the formula II

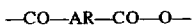

$$—CO—AR—CO—O— \quad (II)$$

wherein Ar is a bifunctional aromatic group, optionally including units in which Ar is sulphonated;
(iii) at least 30 mole % of monomer units of a polyol having at least 3 hydroxyl groups, having the formula III:

$$—CH_2—A—CH_2—O— \quad (III)$$

wherein A is a bifunctional group containing at least 1 carbon atom and at least 1 hydroxyl group;
(iv) optionally other ingredients to 100 wt %,
all percentages being based on the detergent composition.

15. A detergent composition as claimed in claim 14, which comprises from 0.02 to 10 wt % of the copolymer.

16. A detergent composition as claimed in claim 14, which comprises from 0.1 to 3 wt % of the copolymer.

* * * * *